(12) United States Patent
Kerr et al.

(10) Patent No.: US 7,176,465 B2
(45) Date of Patent: Feb. 13, 2007

(54) COMPUTER RADIOGRAPHIC SCANNER UTILIZING A SCAN BAR

(75) Inventors: Roger S. Kerr, Brockport, NY (US); Seung-Ho Baek, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 271 days.

(21) Appl. No.: 10/718,901

(22) Filed: Nov. 21, 2003

(65) Prior Publication Data

US 2005/0109942 A1 May 26, 2005

(51) Int. Cl.
*G01T 1/20* (2006.01)
(52) U.S. Cl. .............................. 250/361 R; 250/336.1; 250/338.1; 250/340
(58) Field of Classification Search ............. 250/336.1, 250/338.1, 340, 361 R, 361
See application file for complete search history.

(56) References Cited

U.S. PATENT DOCUMENTS

| | | | | |
|---|---|---|---|---|
| RE31,847 E | | 3/1985 | Luckey | |
| 4,725,891 A | * | 2/1988 | Manian | 358/406 |
| 4,742,225 A | * | 5/1988 | Chan | 250/586 |
| 4,829,180 A | * | 5/1989 | Goto et al. | 250/586 |
| 5,420,441 A | * | 5/1995 | Newman et al. | 250/581 |
| 5,939,728 A | * | 8/1999 | Wachtel et al. | 250/586 |
| 2002/0057339 A1 | * | 5/2002 | Shoenfeld | 348/86 |

\* cited by examiner

*Primary Examiner*—Otilia Gabor
*Assistant Examiner*—Christine Sung
(74) *Attorney, Agent, or Firm*—Nelson Adrian Blish

(57) ABSTRACT

The scanning device for radiographic media (28) is made of a rotatable vacuum drum (40) has an external surface (42) that, rotates about a longitudinal axis (7); the radiographic media is disposed on the external surface; a moveable scan bar (24) is mounted on two translation rods adjacent the drum; at least one scan module is mounted on the moveable scan bar; a translation drive is connected to the moveable scan bar for moving the moveable scan bar perpendicular to the longitudinal axis; an analog to digital converter (32) in communication with the scan modules receives scanned signals from the scan modules; a control process unit (34) receives scanned signals; and an output device (36) for writes the received scanned signals onto diagnostic media.

1 Claim, 3 Drawing Sheets

COMPUTER RADIOGRAPHIC SCANNER UTILIZING A SCAN BAR

CROSS REFERENCE TO RELATED APPLICATIONS

Reference is made to commonly-assigned co-pending U.S. patent application Ser. No. 10/719,630, filed Nov. 21, 2003, entitled INTEGRATED SCAN MODULE FOR A COMPUTER RADIOGRAPHY INPUT SCANNING SYSTEM, by Baek et at.; and U.S. patent application Ser. No. 10/718,903, filed Nov. 21, 2003, entitled COMPUTER RADIOGRAPHIC SCANNER HAVING A LIGHT EMITTING DIODE ARRAY AND CHARGE COUPLED DETECTOR ARRAY, by Kerr et al., the disclosures of which are incorporated herein.

FIELD OF THE INVENTION

This invention relates in general to radiography and in particular to scanning a computer radiographic phosphor plate having a latent image to generate a digital image file by means of a scanning apparatus.

BACKGROUND OF THE INVENTION

In a photo-stimulable phosphor imaging system, as described in U.S. Pat. No. RE 31,847, a photo-stimulable phosphor sheet is exposed to an image wise pattern of short wavelength radiation, such as x-radiation, to record a latent image pattern in the photo-stimulable phosphor sheet. The latent image is read out by stimulating the phosphor with a relatively long wavelength stimulating radiation such as red or infrared light. Upon stimulation, the photo-stimulable phosphor releases emitted radiation of an intermediate wavelength such as blue or violet light in proportion to the quantity of short wavelength radiation that was received. To produce a signal useful in electronic image processing, the photo-stimulable phosphor sheet is scanned in a raster pattern by a beam of light produced for example by a laser deflected by an oscillating or rotating scanning mirror and the emitted radiation is sensed by a photo-detector such as a photomultiplier tube to produce the electronic image signal.

Current commercial practices indicate that scanners for radiographic images, in particular for phosphoric plates are very slow. The movement is often jolting and imprecise.

A need has existed for a method to scan radiographic images from radiographic media and then rewrite the scanned image using a film writer that is fast, stable and has a continuous drive system so that the scanning rates are improved and the image quality improves. The present invention was developed to meet that need.

SUMMARY OF THE INVENTION

One embodiment of the present invention is a scanning device for radiographic media. The scanning device includes a rotatable vacuum drum that rotates about a longitudinal axis. A radiographic media is disposed on the external surface of the drum. A moveable scan bar mounted on at least one translation rod adjacent the drum is driven by a translation drive that moves the scan bar perpendicular to the longitudinal axis. The moveable scan bar has at least one scan module that scans the radiographic media. The scanned images from each scan module are sent to an analog to digital converter. The analog to digital converter converts the scanned signal and sends the signal to a control process unit for receiving scanned signals. The signal is then sent to an output device for writing the received scanned signals onto diagnostic media.

Another embodiment of the present invention is a method for scanning radiographic media and writing scanned images on diagnostic film. The method begins by placing the radiographic media on a vacuum drum, bringing the radiographic media up to a predefined rotational speed, and then scanning the radiographic media with all scanning modules simultaneously. The method continues by converting the scanned images from analog to digital images and then compiling with a control process unit the digital images from the different scanning modules forming a continuous and complete image. The method ends by transmitting the compiled and complete digital image to an output device.

The invention and its objects and advantages will become more apparent in the detailed description of the preferred embodiments presented below.

BRIEF DESCRIPTION OF THE DRAWINGS

While the specification concludes with claims particularly pointing out and distinctly claiming the subject matter of the present invention, it is believed that the invention will be better understood from the following description when taken in conjunction with accompanying drawings.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

Figure 1:
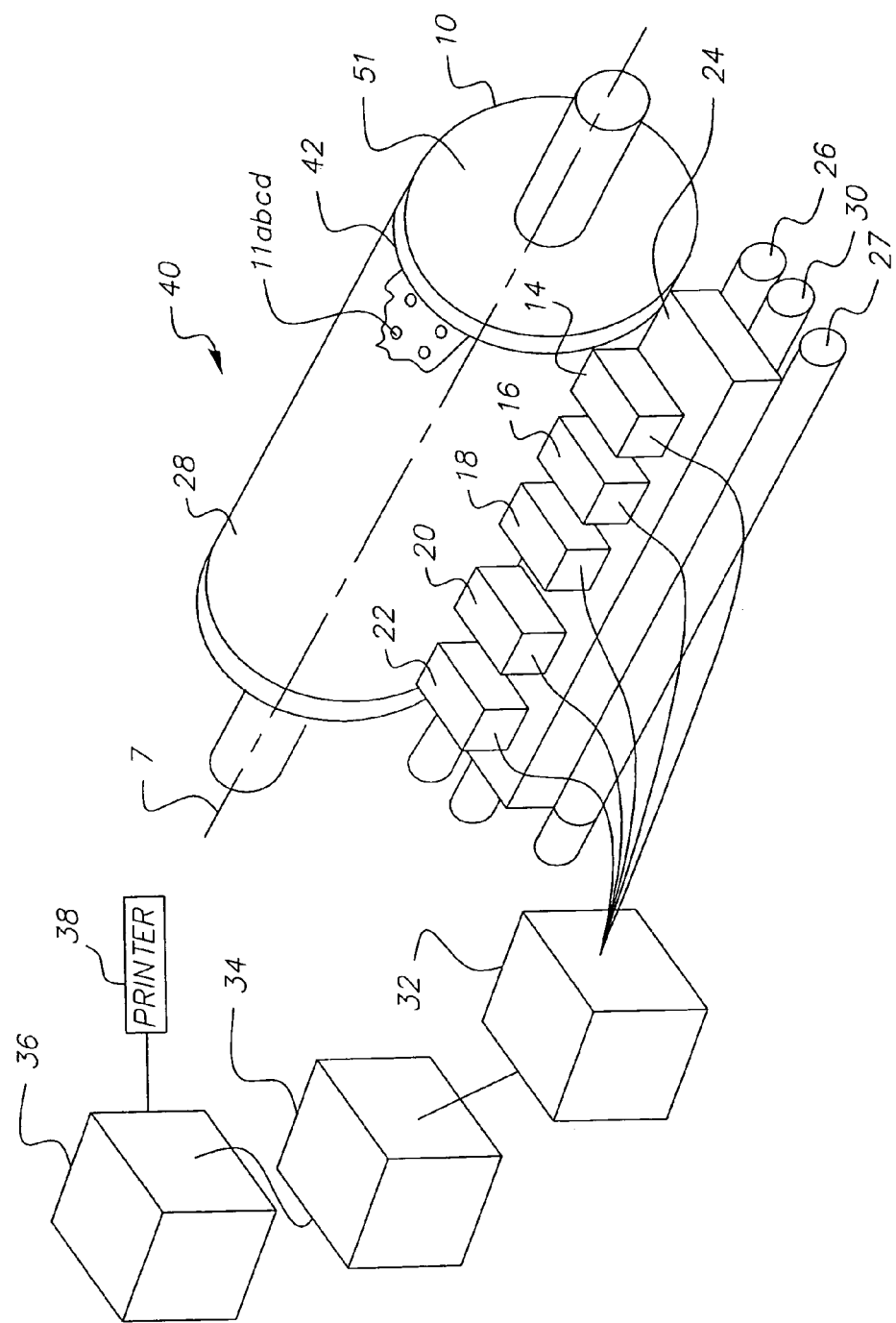
FIG. 1 is a perspective view of the system invention.

FIG. 1 depicts the embodiment of a scanning device for radiographic media or sheet 28 including a rotatable vacuum drum 40. The rotatable vacuum drum 40 has an external surface 42 and rotates about a longitudinal axis 7. A drum is, by definition, hollow, and includes a hollowed-out interior portion. The rotatable vacuum drum 40 rotates between 100 rpm and 1000 rpm around the longitudinal axis 7, preferably 500 rpm. The preferred circumference for the rotatable vacuum drum 40 is between 15 inches and 20 inches, but the size can vary depending upon the need.

The rotatable vacuum drum 40 usable in this invention has a cylindrical-shaped vacuum drum housing. Typically, the rotatable vacuum drum 40 includes vacuum holes extending through the vacuum drum housing. The figure depicts a sample of vacuum holes (11*a*, 11*b*, 11*c*, and 11*d*).

Vacuum is applied from the hollow interior portion of the rotatable vacuum drum 40 through the vacuum holes. The vacuum supports and maintains the position of a single sheet of radiographic media 28 as the rotatable vacuum drum 40 rotates around the longitudinal axis 7. The radiographic media 28 is typically a phosphor sheet.

The ends of the rotatable vacuum drum 40 are typically closed by two vacuum end plates. FIG. 1 only depicts one of the vacuum end plates 51.

The scanning device includes a radiographic media 28 disposed on the external surface of the drum.

The scanning device includes a moveable scan bar 24 mounted on two translation rods 26 and 27 adjacent the rotatable vacuum drum 40. A drive rod 30 is disposed between the translation bars to move the scan bar 24. The moveable scan bar 24 can be a rectangular metal structure in a preferred embodiment. The rectangular metal structure is mounted on the translation rods and adapted for quick translational movement along the longitudinal axis which is parallel to axis 7.

The scanning device also includes at least one scanning module 22. FIG. 1 depicts the embodiment of using five scanning modules 14, 16, 18, 20 and 22. Each scanning module is mounted on the moveable scan bar.

The scanning modules send their scanned signals to an analog to digital converter 32 which changes the signal to a digital signal. The digital signal is sent to a control processing unit 34 which can be a PC or similar computer, and then to an output device 36 which can be a display. The output device can also have a filmwriter or printer 38 attached to it and signals from the CPU can be sent to two outputs simultaneously.

Figure 2:
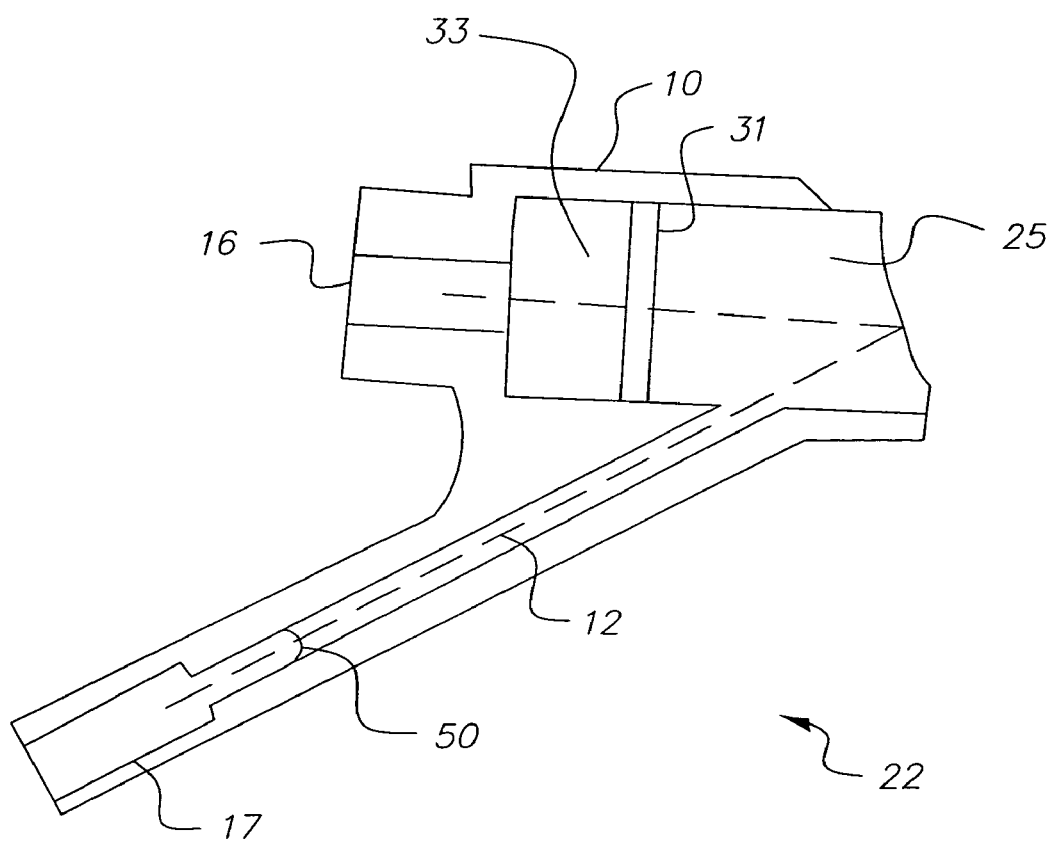
FIG. 2 is a side view of a single scanning module.

FIG. 2 depicts a side view of a single scanning module 22. The scanning module has a housing 10 and a reflective center chamber 25 in the housing that preferably has an elliptical shape or is an ellipsoid. The scanning module contains a laser 17 that transmits a beam of light 12 onto the radiographic media shown in FIG. 1, such as a phosphor sheet to create an image with a high sensitivity, around 0.7 mj/cm2, and an image quality as good as 300 dpi, while sustaining a rate of productivity that is preferably between 80 sheets per hour and 120 sheets per hour.

The scanning module preferably has a small compact design, such as with a diameter of 15 mm to 23 mm, preferably 20 mm, and a length that creates as an ellipsoid with a surface calculated from the following formula:

$$(x2/9.64372)+(y2/9.64372)+((z-11)2/172)=1$$

Figure 3:
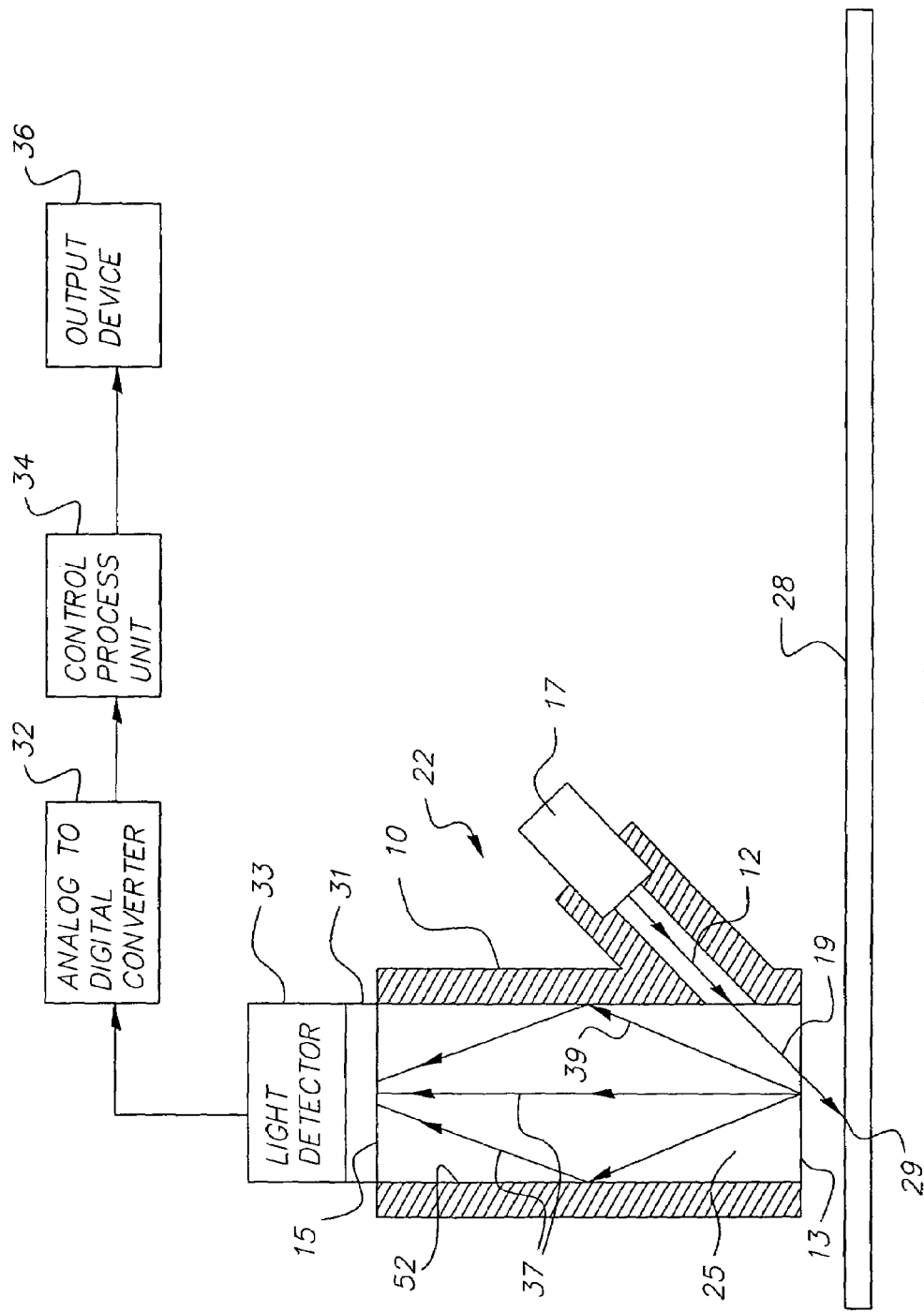
FIG. 3 is a cross sectional view of a single scanning modules usable with the elements of the system of the invention.

The scanning module is adapted for collecting light from an area which has been stimulated on photo-stimulatable radiographic media which is shown in more detail in FIG. 3. The module then, preferably filters that emitted light and then captures the light on a light detector.

To operate the module shown in FIG. 2, the laser 17 disposed in the housing 10 emits a beam of light 12 which can be additionally collimated using a collimator 50. The beam transmits out of the module onto the radiographic media. It is contemplated that multiple housings are connected together, in parallel to form an array for scanning over multiple areas.

The beam 12, which is preferably from a Hitachi single mode 635 nm, 35 mW laser or alternatively a multi mode 635 nm, 100 mW laser could be used. The beam is directed at discrete areas on the radiographic plate that already contains latent images.

The beam stimulates the radiographic plate to produce light, often called emitted light, that is collected by the module, in a preferably cylindrical, ellipsoid shaped chamber 25 which is coated with a reflective coating. This chamber is preferably a mirrored chamber. A minor amount of reflected light may be collected as well in this chamber.

A blue filter 31 is used to selectively pass only the light from the radiographic image to a light detector 33 that is preferably a PMT device, (at least one photo-multiplier tube) or a solid state photodiode. The filter is of the type Hoya 390 or B 410 from Tokyo, Japan or alternatively Schott BG-1 or BG 3 filter available from Schott of Mainz, Germany.

The light detector 33, such as a PMT or photomultiplier type R7400U available from Hamamatsu of Japan, receives the filtered light and generates a signal. The signal is transmitted to the analog to digital converter shown in FIG. 1 to provide a digital signal. The digital signal is then stored as an image frame in a control process unit, such as a computer like a MAC.

Next, the digital image can be processed depending on the needs of the user. For example, the digital image could then be printed on black and white X-Ray film using a filmwriter.

The scanning module is contemplated for use as an input scanner.

FIG. 3 shows another embodiment of the scanner usable in the present invention. In this cross sectional view, a single scanning module 22 is shown in the housing 10 with the first and second openings 13 and 15.

The laser 17 is oriented to generate a beam 12 of stimulating electromagnetic radiation through the first opening 13 where the beam creates a stimulated area preferably between 390 and 400 nm in size. The beam flows through the first opening 13 onto a stimulated area 29 on the photo-stimulatable radiographic media 28. Light 37, hereafter termed "emitted light" 37 is emitted from the stimulated area 29 as well as reflected light 39 bounces from the radiographic media 28 to enter the first opening 13. The emitted light is then transmitted from the center chamber to a filter 31 which is preferably blue. The filter 31 only permits the emitted light from the stimulated area to pass to the light detector 33.

In a preferred embodiment, the center chamber 25 has the following dimensions: a length between 20 mm and 30 mm, preferably about 25 mm; a height between 20 mm and 25 mm, preferably about 20 mm; and a width between 20 mm and 25 mm, preferably about 20 mm.

Table 1 and Table 2 show the optimum coating specifications for the reflective coating 52 used in the center chamber 25 as used in the scope of the invention.

TABLE 1

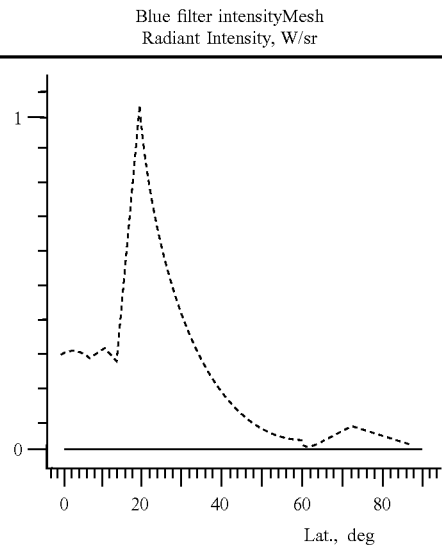

TABLE 2

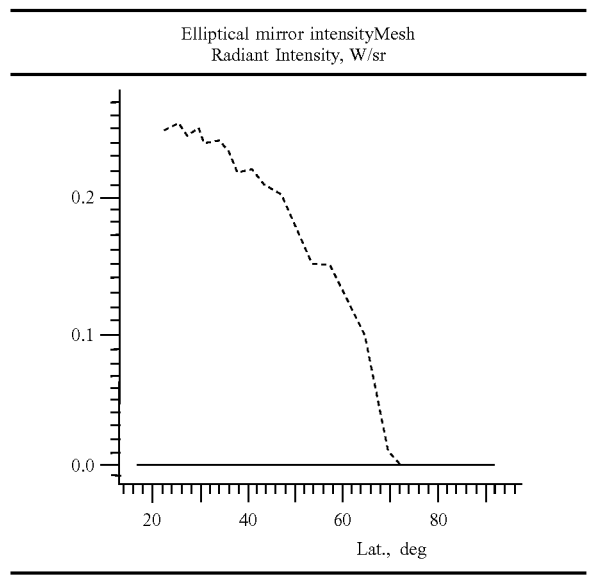

Elliptical mirror intensityMesh Radiant Intensity, W/sr

In a preferred embodiment, the housing 10 can be a one-piece molded structure of a strong polycarbonate, a strong plastic, or a metal. A preferred overall dimension of the housing is a height of 54 mm, a width of 35 mm, and a length of 25 mm.

Alternatively, the housing 10 can be a two-piece construction. In the two-piece construction, the two halves can be joined by conventional attaching devices, such as a latch, welds, or one or more screws.

It should be noted that this system can be used for scanning radiographic media and writing scanned images on diagnostic film.

The method begins by placing the radiographic media on a vacuum drum and bringing the radiographic media up to a predefined rotational speed.

The method continues by scanning the radiographic media with all scanning modules simultaneously and converting the scanned images from analog to digital images. Preferably, each scan module scans a 1-inch swath of the media The method ends by compiling with a control process unit the digital images from the different scanning modules forming a continuous and complete image and then transmitting the compiled and complete digital image to an output device. The completed image can be stored in a control process unit or sent to an output device, such as a film writer or an imaging display.

In an alternative embodiment, the method can further include the step of using the output device and writing the complete image on diagnostic media.

The invention has been described in detail with particular reference to certain preferred embodiments thereof, but it will be understood that variations and modifications can be effected within the spirit and scope of the invention.

PARTS LIST 7 longitudinal axis of drum
10 housing
11a vacuum hole
11b vacuum hole
11c vacuum hole
11d vacuum hole
12 beam
13 first opening
14 first scanning module
15 second opening
16 second scanning module
17 laser
18 third scanning module
20 fourth scanning module
22 fifth scanning module
24 moveable scan bar
25 reflective center chamber
26 first translation rod
27 second translation rods
28 radiographic media
29 stimulated area of the radiographic media
30 drive rod
31 filter
32 analog to digital converter
33 light detector
34 control process unit
36 output device
37 emitted light from the radiographic sheet
38 printer
39 reflected light
40 rotatable vacuum drum
42 external surface of drum
50 collimator
51 vacuum end plates
52 reflective coating

What is claimed is:

1. A scanning device for radiographic media comprising:
   (a) a rotatable vacuum drum comprising an external surface, and wherein the drum rotates about a longitudinal axis;
   (b) a radiographic media disposed on the external surface;
   (c) a moveable scan bar mounted on a first and second translation rod adjacent the drum;
   (d) at least a first scan module and a second scan module mounted on the moveable scan bar, each scan module comprises:
      (1) a housing comprising a channel; a cylindrical center chamber in communication with the channel comprising a mirrored surface, wherein the mirrored surface is an elliptical reflector comprising an overall length between 15 mm and 30 mm and a degree of curvature of the resulting chamber between 20 degrees and 30 degrees; a first opening communicating with the cylindrical chamber; and a second opening communicating with the cylindrical chamber;
      (2) a laser is disposed in the housing and adapted to generate a beam of stimulating electromagnetic radiation through the channel and the first opening to stimulate an area of the photo-stimulatable radiographic media, and wherein the stimulated area emits light and reflected light to enter the first opening and the cylindrical chamber;
      (3) a light detector disposed in the second opening for receiving light emitted and reflected into the cylindrical chamber; and
      (4) a filter disposed at the second opening of the housing for selectively passing only the emitted light from the stimulated area of the photo-stimulatable radiographic media to the light detector;

(e) a translation drive connected to the moveable scan bar for moving the moveable scan bar parallel to the longitudinal axis;

(f) an analog to digital converter in communication with the scan modules for receiving scanned signals from the scan modules;

(g) a control process unit for receiving scanned signals; and (h) an output device for writing the received scanned signals onto diagnostic media.

* * * * *